Nov. 15, 1938.    A. HORN    2,136,506
COTTON-GIN CONDENSER
Filed Oct. 6, 1937    2 Sheets-Sheet 2
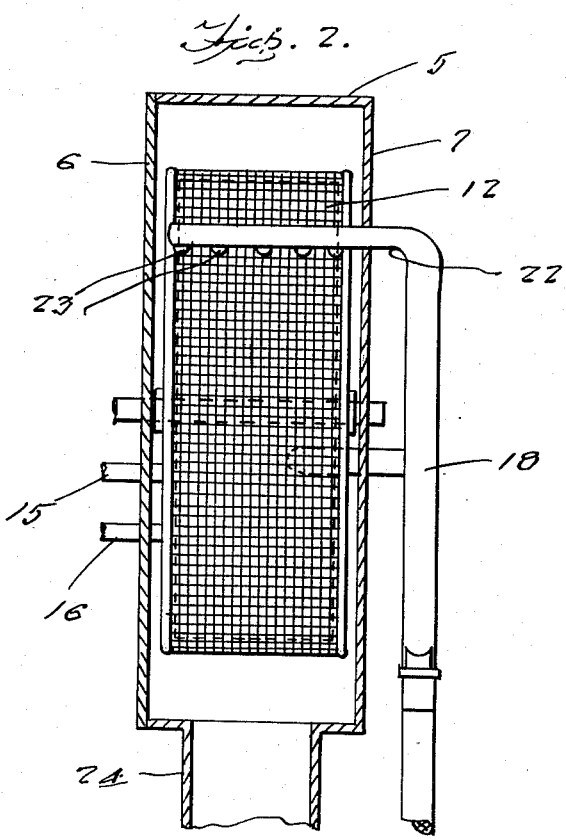
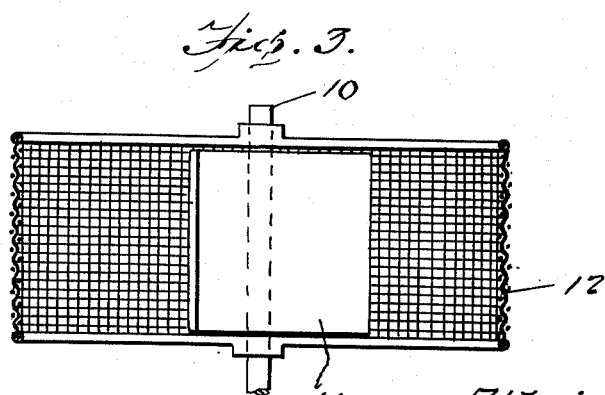
Inventor
Albright Horn
By Clarence A. O'Brien
Hyman Berman
Attorneys Patented Nov. 15, 1938

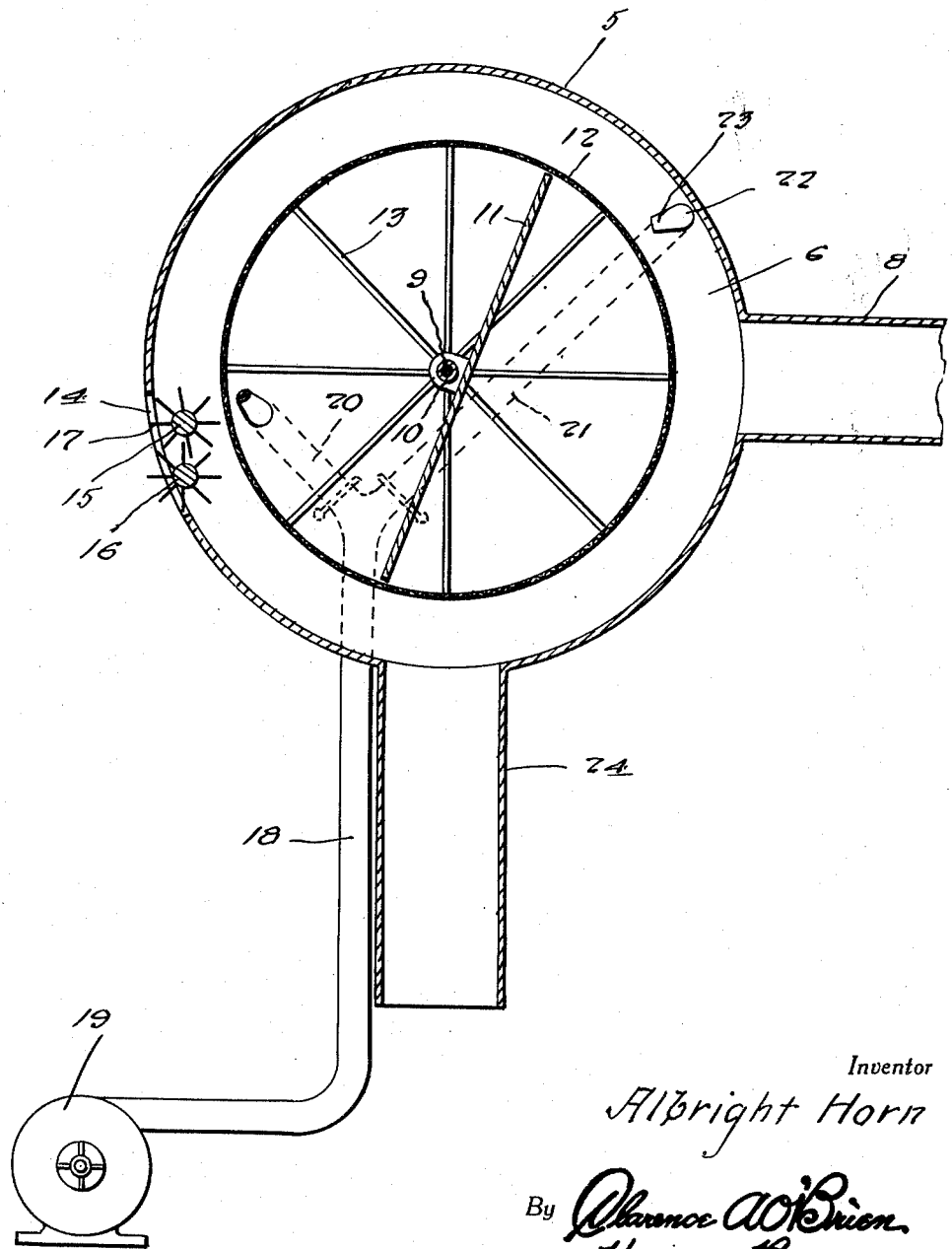

2,136,506

UNITED STATES PATENT OFFICE 2,136,506

COTTON-GIN CONDENSER

Albright Horn, Helena, Ark.

Application October 6, 1937, Serial No. 167,663

1 Claim. (Cl. 19—72)

This invention appertains to new and useful improvements in cotton gins and more particularly to a novel condenser for use in conjunction therewith.

The principal object of the present invention is to provide a cleaning device for cotton in the form of a condenser whereby grit and other foreign matter will be thoroughly cleaned from the cotton.

Other important objects and advantages of the invention will become apparent to the reader of the following specification.

In the drawings:—

Figure 1 represents a vertical sectional view through the condenser.

Figure 2 is a vertical sectional view through the condenser with the compressed air lines in elevation.

Figure 3 is a horizontal sectional view through the rotor.

Referring to the drawings wherein like numerals designate like parts, it can be seen that numeral 5 represents the cylindrical shell having the side walls 6—7 and the cotton inlet pipe 8. Numeral 9 denotes a shaft journaled through the side walls 6—7 and on this shaft is the sleeve 10 stationarily secured against rotation with the shaft 9 and this supports the deflector plate 11 in the inclined position shown in Figure 1. The rotary and cylindrically shaped sieve is denoted by numeral 12 and has the end portions of the deflector plate 11 just barely spaced from the peripheral portion of the same. Spokes 13 connect the screen 12 with the shaft 9 and suitable means can be employed for driving the sieve. At the opposite side of the shell 5 from the inlet pipe 8 is the outlet opening 14 for the treated cotton and inside of the shell 5 and adjacent this opening 14 are the two rolls 15—16 which are provided with a multiplicity of teeth or prongs 17 for catching the treated cotton and feeding the same outwardly of the shell 5.

Numeral 18 denotes a compressed air supply conduit having the blower or compressor 19 at its lower end. The upper end branches into the tube pipe lines 20 and 21. The upper end of the pipe line 21 enters the side wall 6 and extends across the interior of the shell above the inlet pipe 8. This extending portion is denoted by numeral 22 and has a plurality of nozzles or jets 23 projecting therefrom and toward the sieve 12.

The branch pipe section 20 extends through the side wall 6 and into the confines of the sieve 12 on the cotton output side of the baffle 11.

It can now be seen that cotton is supplied to the condenser through the pipe 8 and has a tendency to stick to the sieve 12. As it passes the jets 23 any foreign matter therein will be blown against and through the sieve 12. In the sieve the foreign matter will strike the deflector plate 11 and fall to the bottom of the sieve and gradually work out of the sieve to fall through the chute 24 to a suitable collection receptable located thereunder.

The cotton which has now been cleaned by the nozzles 23 is carried around by the sieve 12 until it is taken off of the sieve by the rolls 15—16 and expelled to the outside of the machine.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A cotton cleaning device of the character described comprising a shell, a cotton inlet, a cotton outlet, a rotary sieve in the shell, a compressed air supply line extending into the shell, said supply line having a plurality of air outlets at the inside of the shell, said outlets being opposed to the said sieve, said compressed air supply line having a branch pipe directed toward the outlet opening for forcing cotton away from the surface of the sieve and toward the outlet opening.

ALBRIGHT HORN.